(12) United States Patent
Jane Santamaria

(10) Patent No.: US 6,986,548 B2
(45) Date of Patent: Jan. 17, 2006

(54) BACKREST WITH HEADREST FOR INFANT SEATS TO BE USED IN MOTORCARS

(75) Inventor: Manuel Jane Santamaria, Palau de Plegamans (ES)

(73) Assignee: Jane, S.A., Palau De Plegamans (Barcelona) (ES)

(*) Notice: Subject to any disclaimer, the term of this patent is extended or adjusted under 35 U.S.C. 154(b) by 0 days.

(21) Appl. No.: 10/843,103

(22) Filed: May 11, 2004

(65) Prior Publication Data

US 2004/0245826 A1 Dec. 9, 2004

(30) Foreign Application Priority Data

May 20, 2003 (ES) .................................. 200301227 U
May 14, 2003 (ES) .................................. 200301160 U

(51) Int. Cl.
A47C 1/08 (2006.01)

(52) U.S. Cl. .................. 297/250.1; 297/483; 297/410

(58) Field of Classification Search ............. 297/250.1, 297/483, 408, 410, 391
See application file for complete search history.

(56) References Cited

U.S. PATENT DOCUMENTS 4,854,639 A * 8/1989 Burleigh et al. ......... 297/250.1
6,336,682 B1 1/2002 Scot
6,623,074 B2 * 9/2003 Asbach et al. ........... 297/250.1

FOREIGN PATENT DOCUMENTS

| DE | 29 23 125 A1 | 12/1980 |
| DE | 297 14 903 U1 | 2/1998 |
| EP | 0 326 265 B1 | 11/1992 |
| EP | 589071 A1 * | 3/1994 |
| EP | 0 751 033 A2 | 1/1997 |
| EP | 0 931 694 A2 | 7/1999 |
| EP | 0 751 033 B1 | 2/2001 |
| EP | 1 084 900 A2 | 3/2001 |
| EP | 1 122 120 A1 | 8/2001 |
| FR | 2 730 460 A1 | 8/1996 |

* cited by examiner

Primary Examiner—Anthony D. Barfield
(74) Attorney, Agent, or Firm—Merchant & Gould P.C.

(57) ABSTRACT

The headrest (2) is liftable, comprises wings (11) and (12) and is provided with passages (3) for the belting (C) of the motorcar's safety belt. The backrest (1) does also characteristically comprise passages (4) for the belting (C) of the motorcar's safety belt, these latter passages because of the fact of being positioned in a lower position as compared with those of the headrest (2) being provided to be used when the child is of a short size so that it can thus be properly held back by the safety belt. A characteristic feature also lies in the fact that the wings (11) and (12) are fitted in a linked connection to the sides of the headrest (2), this latter having a mechanism (13, 14, 15 and 18) linking them to each other and locking them thus selectively setting them at a given angle with respect to the headrest (2).

5 Claims, 2 Drawing Sheets

BACKREST WITH HEADREST FOR INFANT SEATS TO BE USED IN MOTORCARS

OBJECT OF THE INVENTION

A backrest with headrest for infant seats to be used in motorcars.

BACKGROUND OF THE INVENTION

Several types of seats are already in existence which are designed for infants and for their safety are provided to be generally installed on the back seats of motorcars.

Some of these infant seats comprise a backrest being provided with a headrest, said seats being designed for rather young children of 1 to 5 years of age, for example.

In some of said seats the headrest forms an independent part being provided to be fitted to the backrest in an upwardly shiftable arrangement so as to thus be adapted to the infant's size, and in this case the seats can be used for children of up to some 8 years of age.

When the child is very young, because of the fact that the passages for the belting of the safety belt are provided in the headrest said belting extends along the child's head and is hence not properly arranged as regards the child's safety, this latter besides being in an uncomfortable situation.

In this kind of infant seats the wings are solid with the headrest and are arranged at a given angle so that when the child is very young they are too distant for the protection of the child's head, whereas when the child is older the wings are too close to the child's face and are hence a source of discomfort for it.

SUMMARY OF THE INVENTION

The backrest with headrest for infant seats being the object of this invention has been devised in order to solve these problems.

A characteristic feature of this backrest lies in its including passages for the belting of the motorcar's safety belt, so that, because of the fact that they are positioned in a lower position as compared with those of the headrest, the belting does in this case properly extend from the child's shoulder towards its chest, the child thus being perfectly held back and comfortably installed as well.

As the child grows up the passages being provided for the belting of the safety belt in the headrest will be then used.

The above-mentioned passages being provided in the backrest for the belting of the motorcar's safety belt are located in the upper portion of complementary side members at their connection with the backrest and comprise each a grip being apt to hold said belting in the corresponding passage during the use of the safety belt.

As for the headrest, it comprises the wings being fitted to its sides in a linked connection and has a mechanism linking them to each other and locking them thus selectively setting them at a given angle with respect to the headrest in accordance with the size of the child's head as befits its effective protection and comfort.

Said mechanism is installed in a transversal arrangement in the inside of the headrest and comprises at one of its ends a control knob projecting to the outside through the back side of one of the wings.

These and other characteristics will be best made apparent by the following detailed description whose understanding will be made easier by the accompanying two sheets of drawings showing a practical embodiment being cited only by way of example not limiting the scope of the present invention.

DETAILED DESCRIPTION

Figure 1:
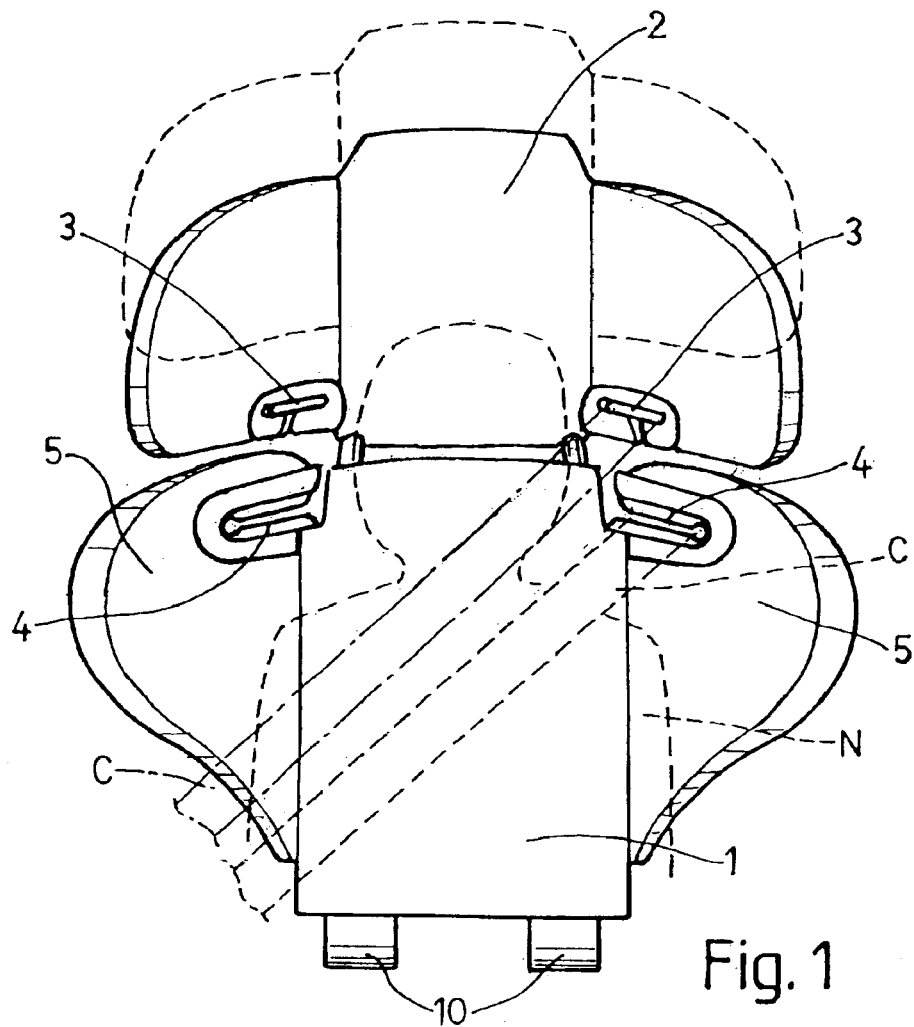
FIG. 1 illustrates in an elevational view the backrest with headrest for infant seats being the object of the invention.
Figure 2:
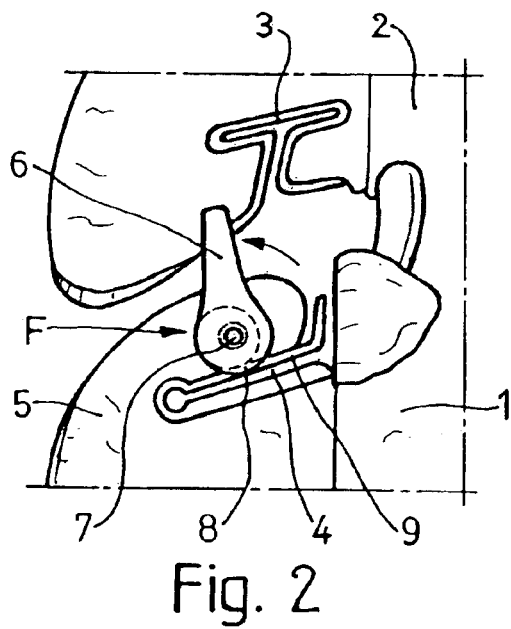
FIGS. 2 and 3 are each a close view showing the grip being provided at each of the passages being provided in the backrest for the belting of the motorcar's safety belt, said grip respectively being in a passive and in an active position.
Figure 3:
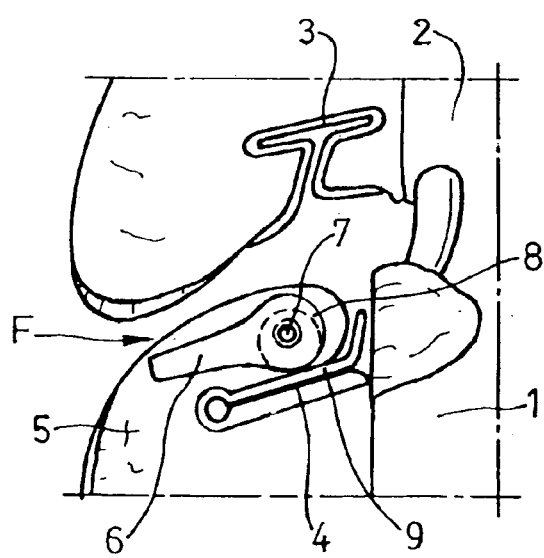

According to the drawings the backrest (1) comprises a liftable headrest (2) being provided with passages (3) for the belting (C) of the motorcar's safety belt.

The backrest (1) does also comprise passages (4) for said belting (C), these latter passages being provided to be used when the child (N) is of short size in order to thus have the safety belt properly holding it back.

The passages (4) being provided in the backrest (1) for the belting (C) are located in the upper portion of complementary side members (5) at their connection with the backrest (1).

Said passages (4) comprise each a grip (F) being apt to hold the belting (C) in the corresponding passage (4) during the use of the safety belt, said grips (F) comprising each an actuating lever (6) being rotatably fitted by means of a pin (7) to each of the complementary side members (5) of the backrest, said lever (6) having an active portion (8) forming a cam and thus acting on a resilient branch (9) being one of the two that make up each of the passages (4).

Numeral (10) denotes the connecting links being provided to removably and in a linked connection fit the backrest (1) to the seat (not shown).

The headrest (2) is vertically and slidingly fitted onto the backrest (1) and does laterally comprise two wings (11 and 12).

Figure 4:
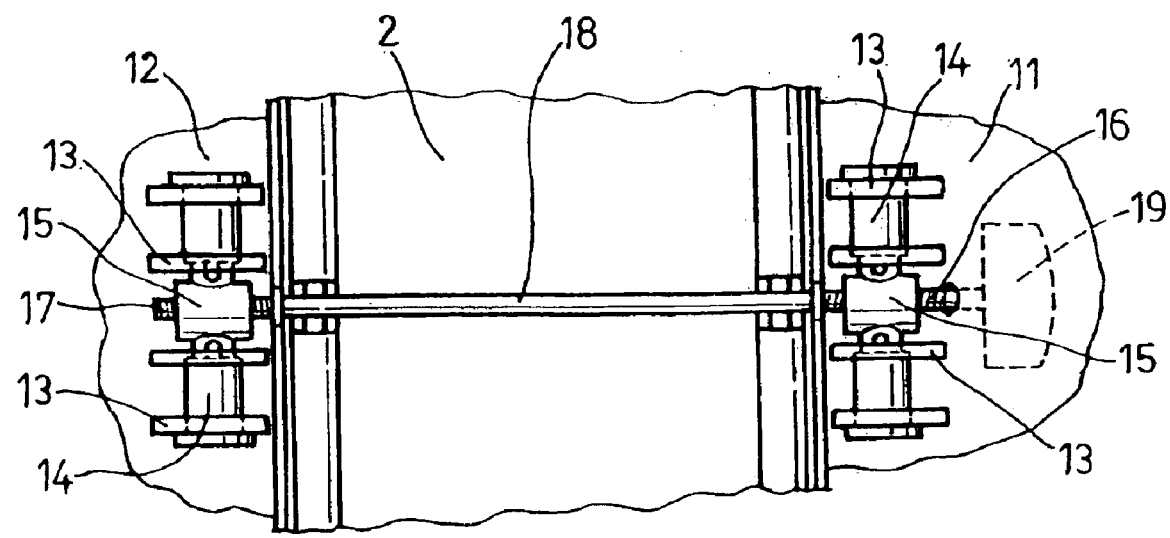
FIG. 4 shows in an elevational view the mechanism mutually linking the wings and locking them at different angles with respect to the headrest.
Figure 5:
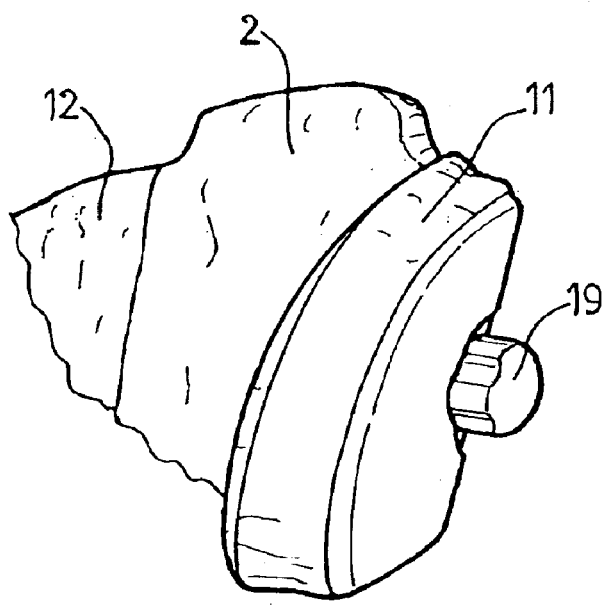
FIG. 5 represents in a perspective view a portion of the headrest showing the control knob of the mechanism corresponding to FIG. 4.

Said wings (11) and (12) are connected in a linked connection through connecting links (13) (FIG. 4) to pins (14) being each vertically solid with a nut member (15) being threadingly engaged with the respective threaded end (16), (17) of a spindle (18) being transversally arranged in the inside of the headrest (2).

The assembly being made up of the connecting links (13), the pins (14), the nut members (15) and the spindle (18) with its threaded ends makes up the mechanism linking the wings (11) and (12) to each other and locking them to thus have them selectively forming a given angle with respect to the headrest (2).

This mechanism comprises a control knob (19) being solid with one of the ends of the spindle (18) and projecting to the outside through the back side of the wing (11).

The threads being provided at the ends (16) and (17) of the spindle (18) have been cut as per opposite hands so that when operating the control knob (19) by rotating it in one direction or in the opposite one the two wings can be adjustably and simultaneously closed in or spread apart with respect to the headrest and can thus be set at a bigger or smaller aperture between them.

The invention can within its essentiality be put into practice in other embodiments only in detail differing from the one having been described above only by way of example, said other embodiments also falling within the scope of the protection being claimed.

What is claimed is:

1. A backrest with headrest for infant seats to be used in motorcars, wherein the headrest is liftable and comprises:
   wings fitted to the sides of the headrest in a linked connection,
      wherein the linked connection has a mechanism linking the wings to each other, and
      wherein the wings are selectively set at a given angle with respect to the headrest and locked, and
   wherein the wings and the backrest are provided with passages for belting a motorcar's safety belt,
      wherein the backrest passages are always maintained in a lower position than the headrest passages, and the safety belt is belted through either the backrest passages or the headrest passages, depending on a child's size.

2. A backrest with headrest for infant seats to be used in motorcars as per claim 1, wherein the backrest passages are located in an upper portion of complementary side members at their connection with the backrest.

3. A backrest with headrest for instant seats to be used in motorcars as per claim 1, wherein the backrest passages each have a grip for holding the safety belt in the corresponding passage.

4. A backrest with headrest for infant seats to be used in motorcars as per claim 1, wherein said mechanism is installed in a transversal arrangement on the inside of the headrest, and said mechanism comprises a control knob at one of its ends, wherein the control knob projects to the outside through a back side of one of the wings.

5. A backrest with headrest for infant seats to be used in motorcars as per claim 1, wherein the mechanism linking the wings to each other comprises a spindle arranged in a transversal arrangement on the inside of the headrest, wherein the ends of the spindle reach the wings, and wherein each end of the spindle has a respective thread, said threads are cut per mutually opposite hands and are threadingly engaged with respective nut members, and each is linked to the corresponding wing.

* * * * *